Patented June 15, 1937

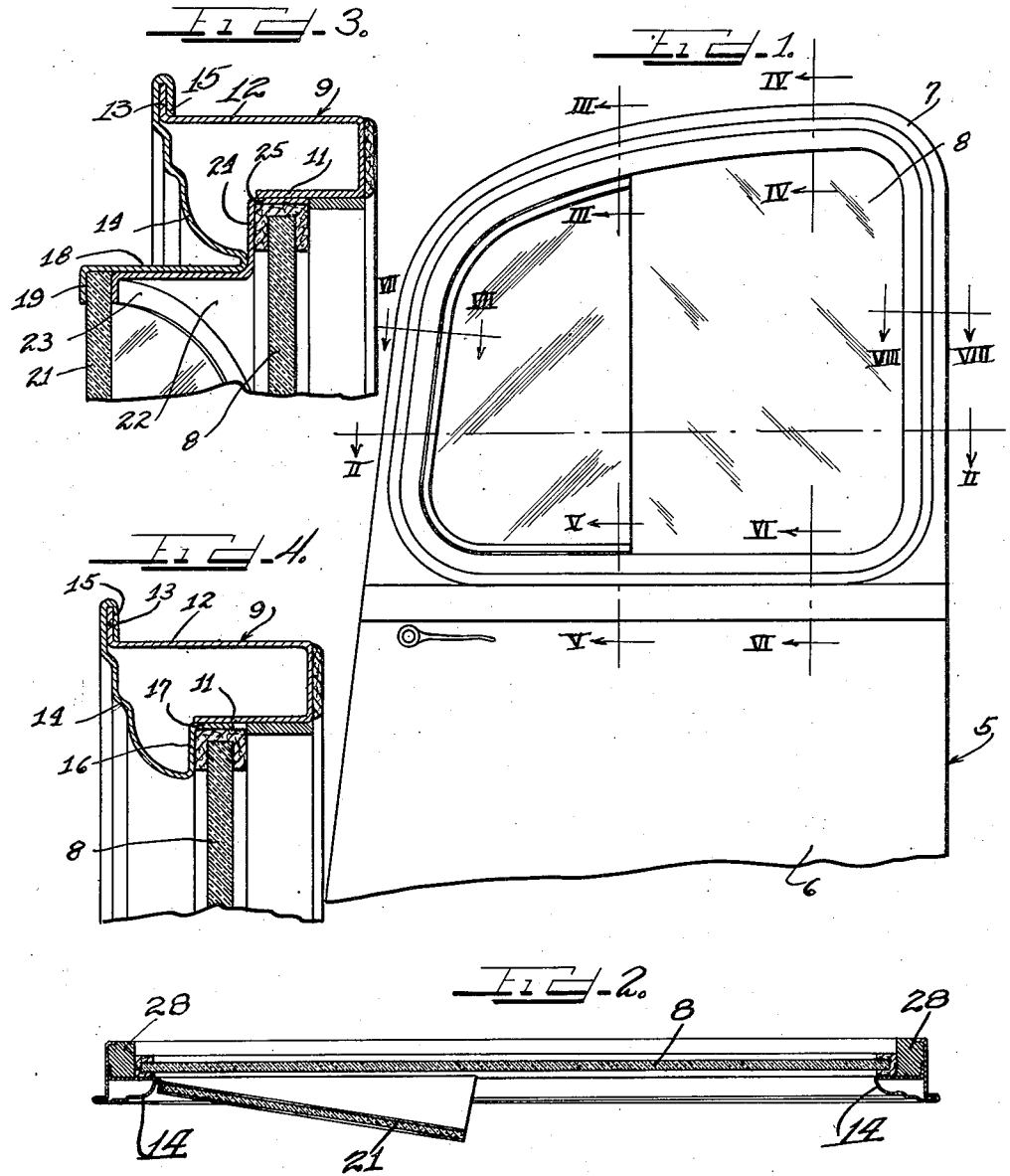

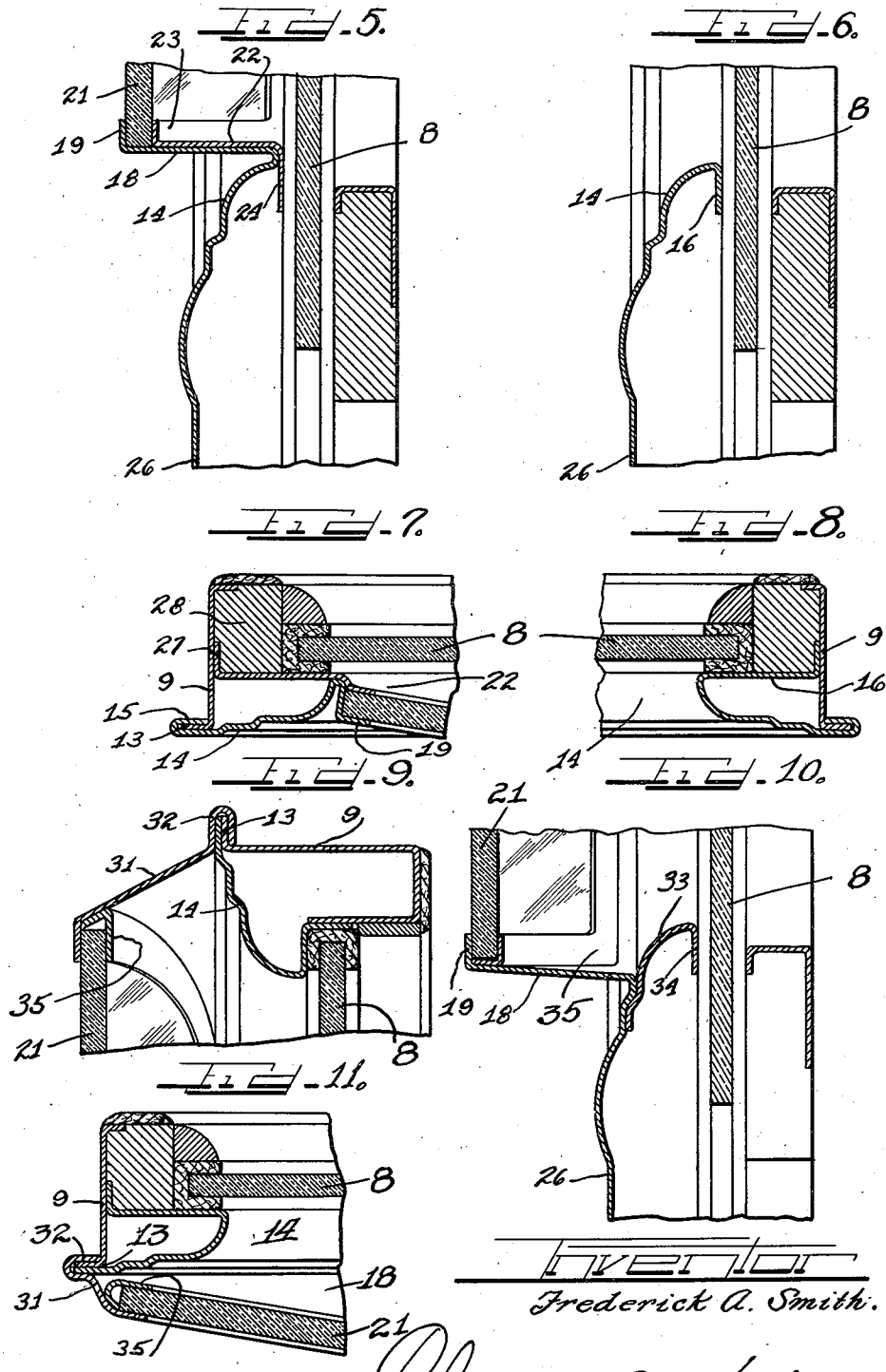

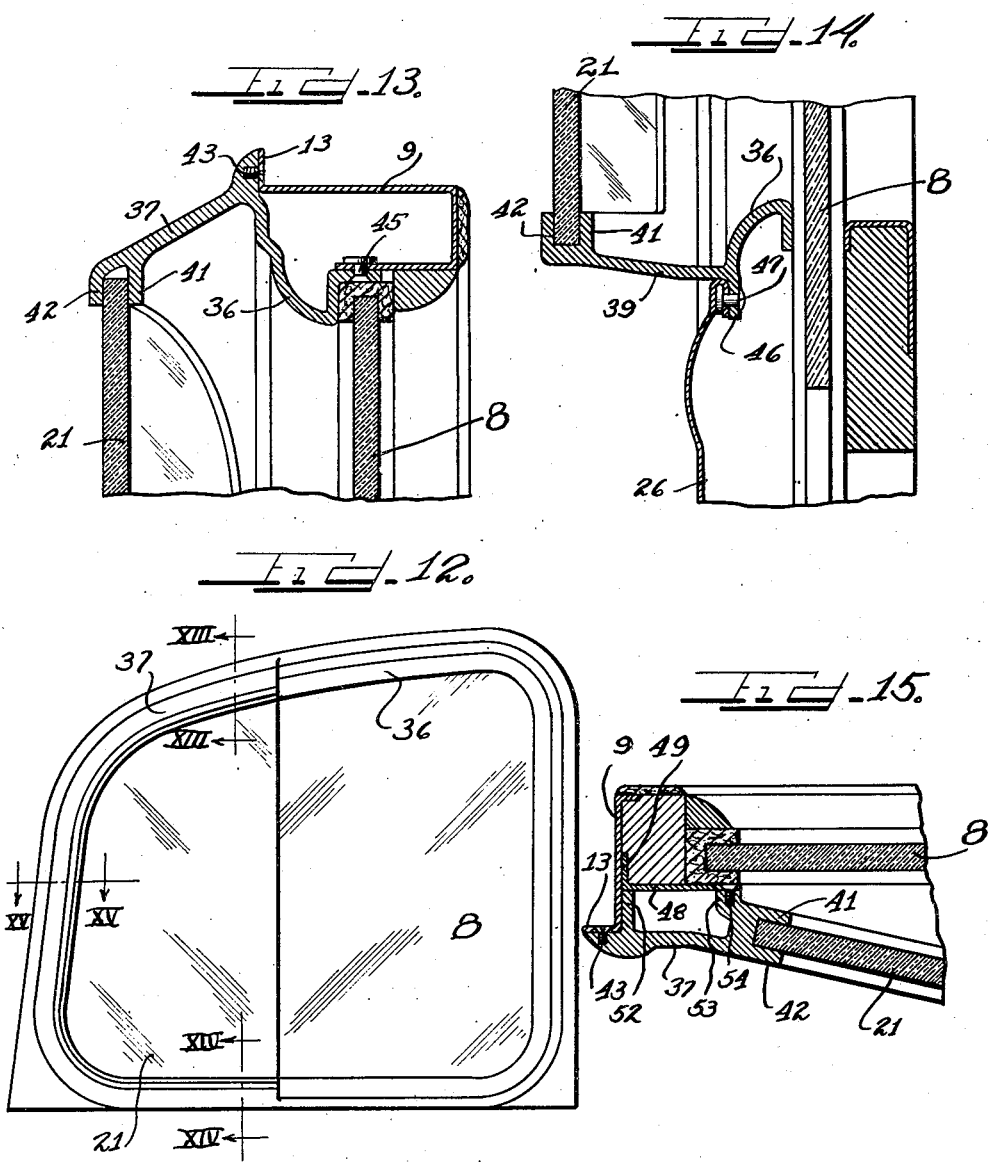

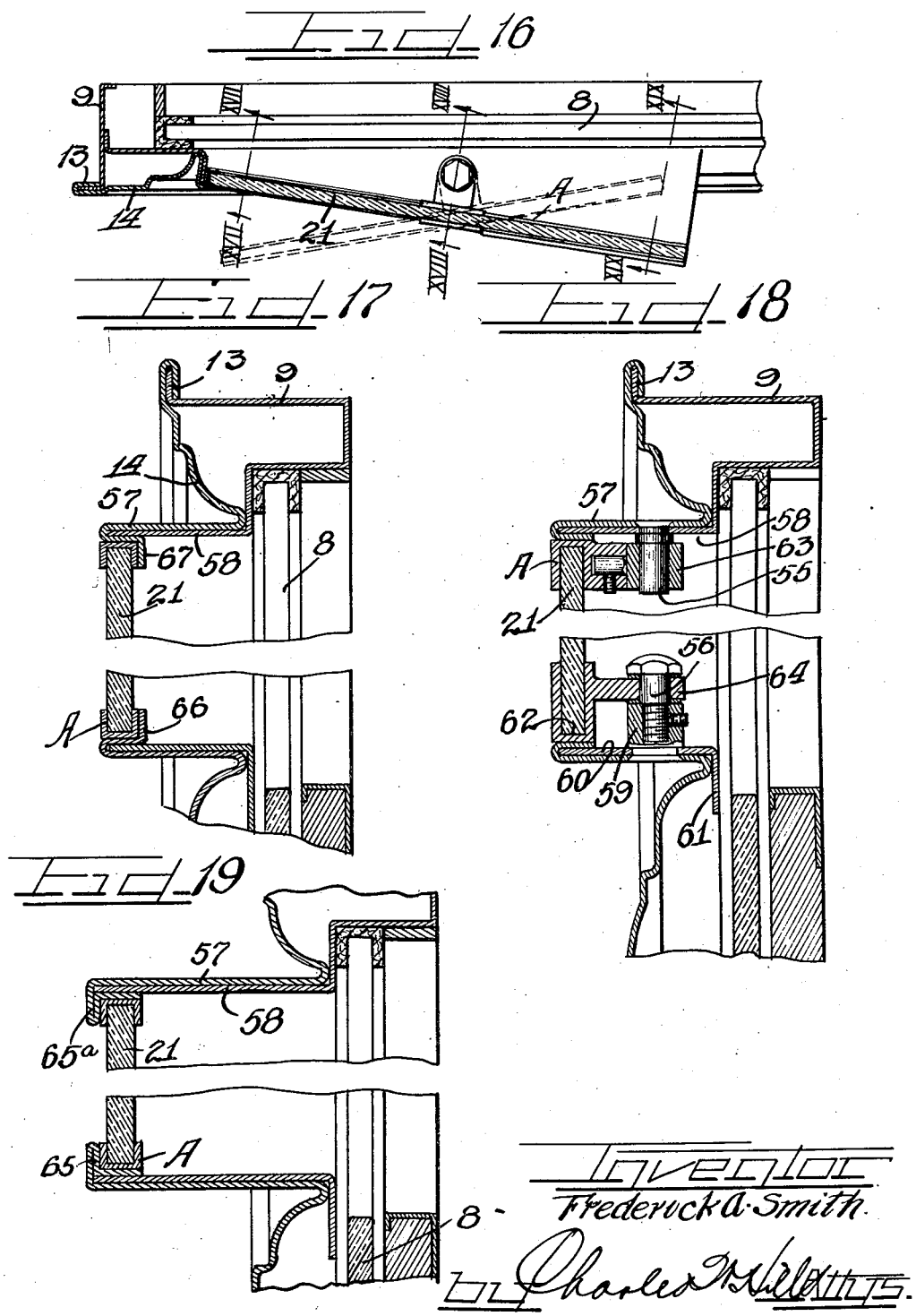

2,083,874

UNITED STATES PATENT OFFICE 2,083,874

AUTOMOBILE AIR VENTILATION

Frederick A. Smith, North Chicago, Ill., assignor, by mesne assignments, to Houde Engineering Corporation, Buffalo, N. Y., a corporation of New York Application November 20, 1933, Serial No. 698,798
Renewed September 23, 1935

15 Claims. (Cl. 296—84)

This invention relates to a ventilating device and will be described as incorporated in a ventilator for the window of an automobile door.

An object of this invention is the provision of an improved ventilator for vehicles which will materially improve the ventilation of the vehicle and at the same time prevent undesirable drafts of air.

A further object of this invention is the provision of an air deflector support constructed integrally with the reveal bounding the window opening, and in such a manner that the metal of the door which would normally be punched out and wasted at the door opening is utilized in the formation of the deflector support.

A still further object of the invention is to provide an improved ventilator for vehicles which is constructed to stream line with the vehicle body to minimize windage.

A further object is the provision of a metal reveal for a window opening, having permanently fixed thereto adjacent its outer edge, a canopy shaped shield for the window opening which also forms a support for the air deflector.

A still further object is to provide a support for a pivoted deflector, which support is an integral part of the reveal bounding the window opening.

Other objects and advantages of this invention will become apparent to those skilled in the art, from the following detailed description with reference to the accompanying drawings.

On the drawings:

Figure 1 is a fragmentary elevation of an automobile door incorporating my invention.

Figure 2 is a horizontal section taken on the line II—II of Figure 1.

Figure 3 is a fragmentary vertical section taken on the line III—III of Figure 1.

Figure 4 is a fragmentary vertical section taken on the line IV—IV of Figure 1.

Figure 5 is a fragmentary vertical section taken on the line V—V of Figure 1.

Figure 6 is a fragmentary vertical section taken on the line VI—VI of Figure 1.

Figure 7 is a fragmentary horizontal section taken on the line VII—VII of Figure 1.

Figure 8 is a fragmentary horizontal section taken on the line VIII—VIII of Figure 1.

Figure 9 is a fragmentary vertical section similar to Figure 3, but illustrating a modification of this invention.

Figure 10 is a fragmentary vertical section similar to Figure 5, but illustrating the modification of the invention disclosed in Figures 9 and 11.

Figure 11 is a fragmentary horizontal section similar to Figure 7, but also illustrating a modification of the invention.

Figure 12 is an elevational view of a window frame illustrating a modified form of this invention.

Figure 13 is a fragmentary vertical section taken on the line XIII—XIII of Figure 12.

Figure 14 is a fragmentary vertical section taken on the line XIV—XIV of Figure 12, also illustrating a fragment of the lower portion of the door associated therewith.

Figure 15 is a fragmentary horizontal section taken on the line XV—XV of Figure 12.

Figure 16 is a fragmental sectional view, similar to Figure 2, showing a pivoted deflector.

Figure 17 is an enlarged fragmental sectional view taken in the plane indicated by the line XVII—XVII of Figure 16.

Figure 18 is an enlarged fragmental sectional view taken in the plane indicated by the line XVIII—XVIII of Figure 16.

Figure 19 is an enlarged fragmental sectional view taken in the plane indicated by the line XIX—XIX of Figure 16.

As shown on the drawings:

The vehicle door illustrated in the drawings is designated by the numeral 5 and comprises a bottom portion 6 and a top portion 7. The portion 6 forms the door proper and the portion 7 forms a window frame having therein a window opening which is normally closed by a closure 8 of plate glass. The window frame comprises a metal frame member 9 having an inner flange 11 defining the window opening and an outer portion 12 defining the edge of the door at the top and sides of the window. The frame member 9 is provided with an outwardly extending flange 13 to which may be secured the reveal element 14, having a reversely extending flange 15 engaging over the flange 13 for locking the reveal in position. The inner edge of the reveal 14 is preferably formed into an angle member 16, the upper flange 17 of which is preferably secured to the portion 11 of the window frame for providing a seat for the closure element 8. This description has particular reference to Figure 4, but also applies to Figure 3, with the exception that in Figure 3 the inner edge of the reveal 14 extends outwardly substantially horizontally as indicated at 18 and downwardly at 19 to provide a support for the air deflector 21. In this form of the invention, it is necessary to provide an additional sheet metal member 22 including a flange 23 cooperating with the flange 19 to provide a channel for the reception of the air deflector 21 and an angle portion 24 including a flange 25 secured to the portion 11 of the frame element 9 to provide a seat for the window closure 8.

As will be seen from an inspection of Figures 5 and 6, the reveal 14 is formed of and is an integral part of the sheet metal 26 forming the outer surface of the lower part of the door. A comparison of Figures 5 and 6 illustrates the variations which are necessary to be made from the normal form of the reveal as taken on the lines V—V and VI—VI of Figure 1, to provide the support for the air deflector as illustrated in Figure 5. In Figure 7 it will be seen that the reveal at the inner edge is turned outwardly from the window opening as in Figures 3 and 5, forming the supporting flange 19 and the member 22 extends to the frame 9, being disposed as indicated at 27 to be interposed between the frame member 9 and the reinforcing door post 28. In Figure 8, the reveal 14 is turned inwardly forming a flange 16 which extends entirely to the frame 9, this being the construction on the side of the window opposite the air deflector, as indicated by the lines on Figure 1, on which the Figures 7 and 8 are respectively taken.

In Figures 9, 10 and 11, illustrating a modified form of this invention, the air deflector support is designed to extend to the outer edge of the reveal, to better protect the window opening, and comprises a separate sheet metal element 31 engaging over the edge of the reveal at the top and forward edge of the door where the member 31 is formed into an inverted U-shaped channel 32 for receiving the flange 13 of the frame 9, and the marginal edge of the reveal 14. At the lower edge of the window frame, the air deflector support includes the outwardly extending flange 19 of the door metal 26, as in Figure 5. In this construction, a separate element 33 forms the reveal across the lower edge of the window opening and includes a downwardly extending flange 34 forming a guide for the closure element. In this modification a separate angle member 35 is provided which cooperates with the member 31 and at the bottom of the door with the flanges 18 and 19 to form a channel for the reception of the air deflector 21.

In the modification of my invention illustrated in Figures 12 to 15, inclusive, the outer surface of the window frame including the reveal 36 and the air deflector support 37, preferably consists of a single casting extending entirely around the window opening, although, if desired, it may extend only as far as the rearward edge of the air deflector, the remainder of the reveal being directly formed from the metal of the door. In this form of my invention, as in the form illustrated in Figures 9, 10 and 11, the supporting element for the air deflector comprises a canopy which at the top of the door extends from the upper edge of the reveal. Likewise, at the bottom of the window opening, the portion of the support which fastens beneath the air deflector, as illustrated at 39, extends substantially horizontally from the lower edge of the reveal. This construction provides protection for the window opening from top to bottom, preventing undesirable currents of air blowing through the window opening when the closure element 8 is open a small distance from the top. The supporting edge of the member 37 is provided with parallel flanges 41 and 42 forming a channel for the reception of the air deflector 21. The member 37 has its outer marginal portion secured to the flange 13 of the frame member 9 by a series of screws 43, and the inner edge of the reveal portion 36 is preferably secured along the upper edge of the window opening by suitable rivets 45. The lower edge of the casting 37 is provided with a flange 46 which is secured to the metal 26 of the door by suitable rivets 47. Along the forward edge of the window opening, a separate metal plate 48 having a flange 49 is secured to the frame member 9 and provides an abutment for the inwardly extending flange 52 on the casting 37 and for a similar inwardly extending flange 53 which is rigidly secured thereto by a series of screws 54.

In the forms of this invention illustrated in Figures 1 to 10, inclusive, the various sheet metal parts are preferably spot welded together at their points of contact, making a permanent rigid connection without the necessity of employing screws and rivets.

The modification of the invention illustrated in Figures 16 to 19, inclusive, has to do with a pivoted deflector or wing which is adapted to deflect wind from a window in one position and which, when in another position, is adapted to cause air to be deflected into the window opening.

The window frame 9 is provided with the outwardly extending flange 13 to which the reveal element 14 is secured, in the manner heretofore described.

In this modification, the deflector plate 21 is arranged to pivot about the pins 55 and 56. The upper pin 55 is carried in an outwardly extending portion of the reveal 14, which portion is reinforced by flange members 58 and which flange portions 58 are so fashioned as to provide a seat for the closure member 8.

The lower pivot pin 56 is preferably threaded into a boss 59 which is securely fastened to a portion of the flange 57 of the reveal adjacent the lower margin of the door opening. This portion of the reveal is reinforced by a flange member 60, having a part 61 which is so constructed as to serve as a guide for the closure member 8. The outward margins of the flange portion 57 of the reveal are bent over the extremities of the flanges 58 and 60 so as to make a finished margin.

The deflector member 21 is carried in a frame structure designated generally as A, which structure is provided with a suitable recess 62 having a seat for the deflector member 21. Integrally formed with the frame A are top and bottom lugs 63 and 64 cooperating with the pivot pins 55 and 56, to hinge the frame A on said pivot pins. The parts are so constructed that normally the deflector plate 21 lies in the inclined position illustrated in Figure 16; that is, in a position to deflect wind away from the window opening normally closed by the closure member 8.

Where it is desired to admit air into the interior of the vehicle through the window opening, the deflector plate 21 may then be swung about its pivot pins 55 and 56 to swing the left hand end of the deflector plate, as illustrated in Figure 16, outwardly. It will be observed that by this modification, the deflector plate 21 is pivotally supported in the window opening or adjacent the window opening by the reveal, which is formed as an integral part of the material of which the door is constructed.

It will be observed that a portion of the reveal forwardly of the pivot pins 55 and 56 is inturned to allow outward swinging movement of the deflector panel 21 when it is moved in the manner just described. The portion of the reveal on the other side of the pivot pins; that is, at the right, as viewed in Figure 16, is provided with upstanding ledge 65 adjacent the bottom of the deflector frame A and a depending ledge 65a adjacent the upper margin of the deflector frame A. In like manner, the reveal provides an upstanding ledge 66 adjacent the inner surface of the lower portion of the frame A, forwardly of the pivot pins, and a like depending ledge 67 for the upper portion of the frame. Provision of the ledges 64, 65, 66 and 67 prevents admission of rain, snow or the like when the deflector plate is closed; that is, in the position shown by full lines in Figure 16.

It will be observed that all of the illustrated modifications of the present invention utilize the metal of which the door is constructed as forming the reveal for supporting the deflector plate, be the deflector fixed or pivotal. In this manner, the metal which is ordinarily wasted is utilized, thus reducing the cost of manufacture and at the same time providing a finished appearance of the completed structure.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

I claim as my invention:

1. In a device of the class described, a metal reveal for a window opening, said reveal including an inner marginal flange reversely disposed about a portion of the window opening to provide a seat for a closure element, said flange about another portion of the window opening being disposed outwardly from the window and having a vertically disposed flange thereon providing a seat for an air deflector.

2. In a device of the class described, a metal reveal for a window opening, said reveal including an inner marginal flange reversely disposed about a portion of the window opening to provide a seat for a closure element, and an outwardly extending flange forming a shield for the window opening and including edge flanges providing a seat for an air deflector.

3. In a device of the class described, a metal reveal for a window opening, said reveal including an inner marginal flange reversely disposed about a portion of the window opening to provide a seat for a closure element, and an outwardly extending flange formed integrally with the outer edge of the reveal and extending outwardly and at an angle to the window opening adapted to provide a shield and support for an air deflector.

4. In a ventilator of the class described, an air deflector, a metal reveal for a window opening, supporting means for the air deflector, comprising an integral extension on one edge of the reveal and an angle member associated therewith for providing a channel for the reception of the deflector.

5. In a ventilator of the class described, an air deflector, a metal reveal for a window opening, supporting means for the air deflector, comprising an integral extension on one edge of the reveal and an angle member associated therewith for providing a channel for the reception of the deflector, one edge of said angle member providing a seat for a window closure.

6. In a device of the class described, a metal reveal for a window opening, said reveal including an inner marginal flange reversely disposed about a portion of the window opening to provide a seat for a closure element, and an outwardly extending flange formed integrally with the outer edge of the reveal and extending outwardly and at an angle to the window opening adapted to provide a shield and support for an air deflector, said reveal and said flange thereon being incorporated in a single stamping completely surrounding the window opening.

7. In a ventilator for an automobile including a window frame having a window opening, a sheet metal reveal surrounding the window opening, an air deflector for the opening, said reveal comprising a flange on the outer edge thereof engaging over and secured to a portion of the frame, and a flange on the inner edge forming an angle and disposed to provide a seat partially around the window opening and spaced therefrom forming a support for the air deflector, and means secured to said support and cooperating therewith to embrace the edge of the deflector, and including an inwardly extending angle portion secured to the frame and providing a seat for a window closure.

8. In combination with an automobile door including a window frame formed integral with the door and having a window opening, a closure element for closing the window opening, a reveal formed of sheet metal of the door and extending entirely around the window opening, said reveal including a reversely extending marginal portion fitted over and secured to the window frame and another marginal portion extending outwardly from the window frame and providing a support for an air deflector, and a sheet metal member secured to the inner side of the support portion of the reveal and to the window frame to provide a seat for the window closure.

9. A sheet metal reveal for a window opening including a support comprising an integral marginal portion extending outwardly from and around the front end of the window opening at the inner edge of the reveal and providing a shield and support for an air deflector.

10. In a ventilator of the class described, an air deflector, a metal reveal for a window opening, supporting means for the air deflector comprising an integral extension forming a shield on the outer forward edge of the reveal and including a channel-shaped edge portion for embracing the edge of the deflector.

11. In a ventilator for an automobile including a window frame having a window opening, a sheet metal reveal surrounding the window opening, an air deflector for the opening, said reveal comprising a flange on the outer forward edge thereof engaging over and secured to a portion of the frame, and a flange on the inner edge forming an angle and disposed to provide a seat partially around the window opening and spaced therefrom forming a support for the air deflector.

12. In a ventilator for an automobile including a window frame having a window opening, a sheet metal reveal surrounding the window opening, an air deflector for the opening, said reveal comprising a flange on the outer forward edge thereof engaging over and secured to a portion of the frame, and a flange on the inner edge forming an angle and disposed to provide a seal partially around the window opening and spaced therefrom forming a support for the air deflector, and means secured to said support and cooperating therewith to embrace the edge of the deflector.

13. In combination with an automobile door including a window frame formed integral with the door and having a window opening, a closure element for closing the window opening, a reveal formed of sheet metal of the door and extending entirely around the window opening, said reveal including a marginal flange extending outwardly parallel with the surface of the door and along the forward end of said opening, an air deflector for the window opening and a support therefor rigidly fixed to said marginal flange and to the window frame.

14. In combination with an automobile door including a window frame formed integral with the door and having a window opening, a closure element for closing the window opening, a reveal formed of sheet metal of the door and extending entirely around the window opening, said reveal including a marginal flange extending outwardly parallel with the surface of the door and along the forward edge of said opening, an air deflector for the window opening and a support therefor rigidly fixed to said marginal flange and to the window frame, said support concealing the forward portion of said reveal and providing a shield for the window.

15. In combination with an automobile door including a window frame formed integral with the door and having a window opening, a closure element for closing the window opening, a reveal formed of sheet metal of the door and extending entirely around the window opening, said reveal including a reversely extending marginal portion fitted over and secured to the window frame and another marginal portion extending outwardly from the window frame and providing a support for an air deflector at the forward end of said opening.

FREDERICK A. SMITH.